J. WALSH.
FLYING MACHINE.
APPLICATION FILED AUG. 1, 1911.
1,025,891.
Patented May 7, 1912.
14 SHEETS—SHEET 1.
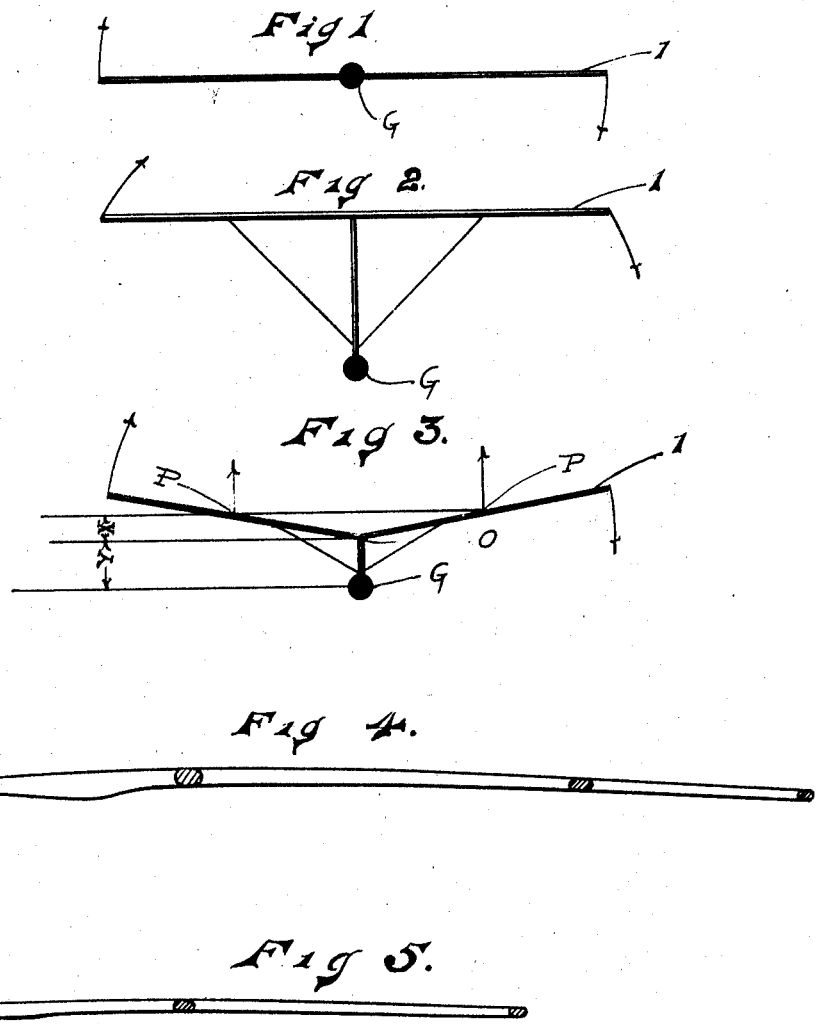
Witnesses
B. G. Nelson
H. J. Nelson
Inventor
James Walsh.

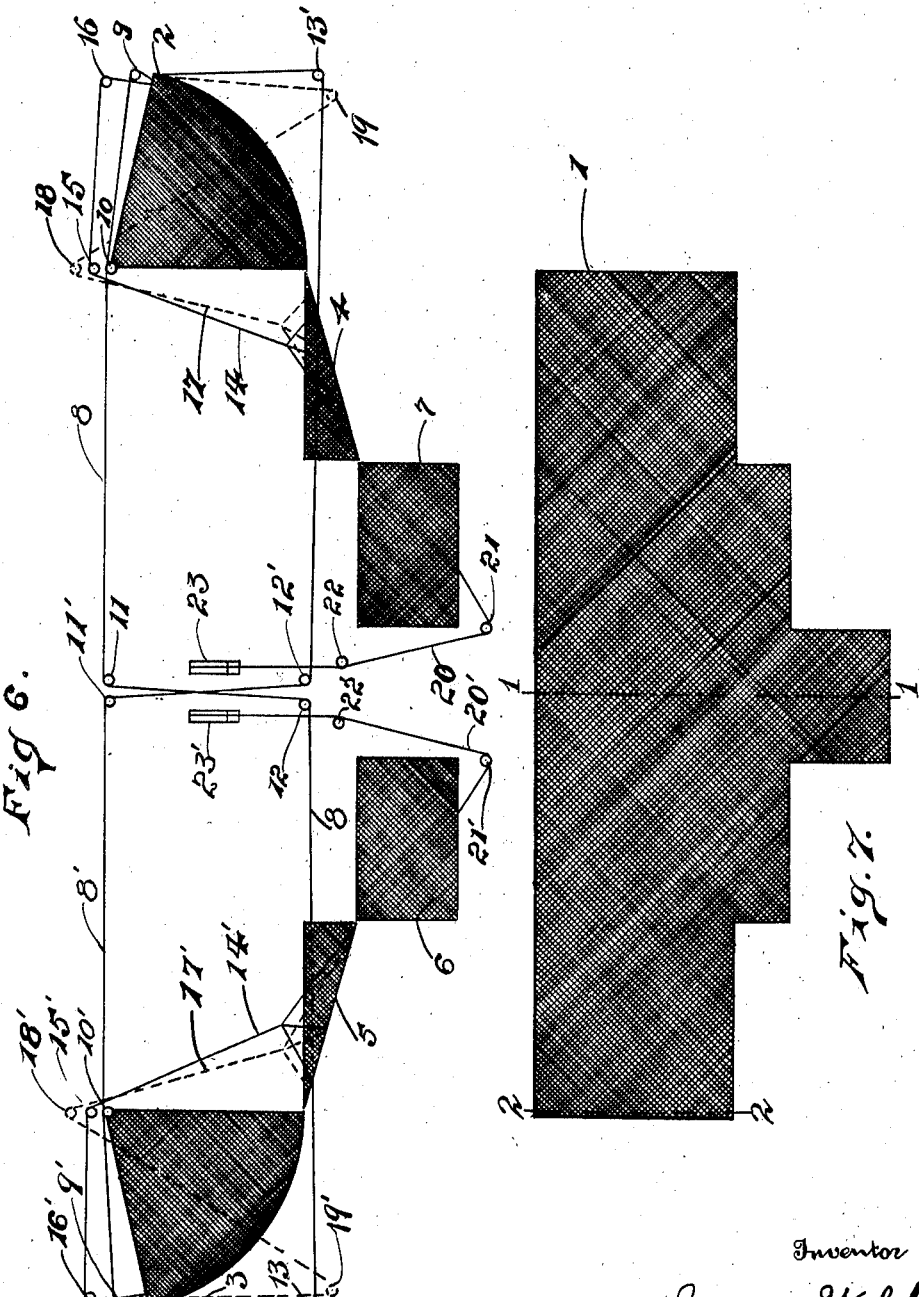

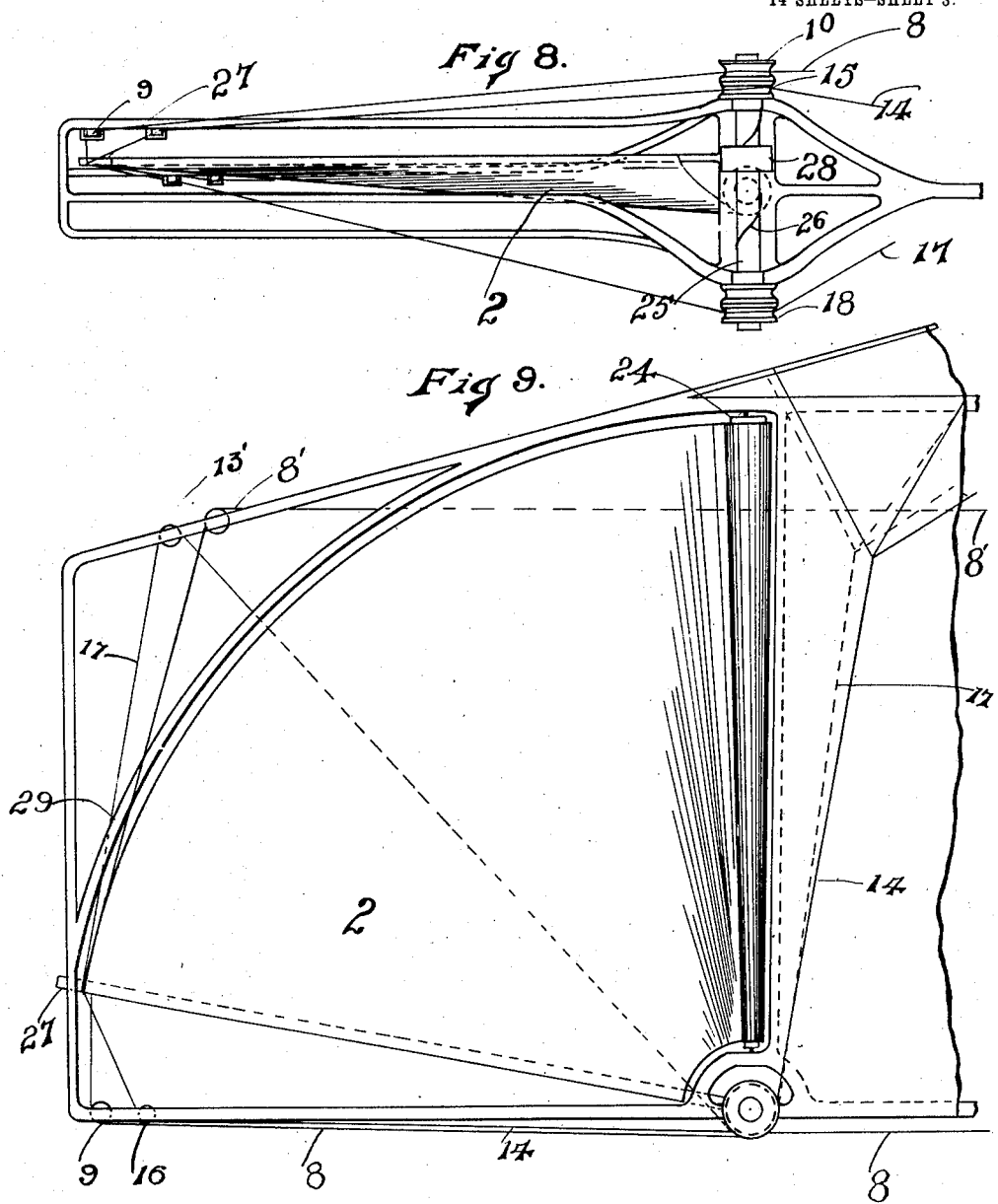

J. WALSH.
FLYING MACHINE.
APPLICATION FILED AUG. 1, 1911.

1,025,891.

Patented May 7, 1912.
14 SHEETS—SHEET 4.

Witnesses

Inventor
James Walsh

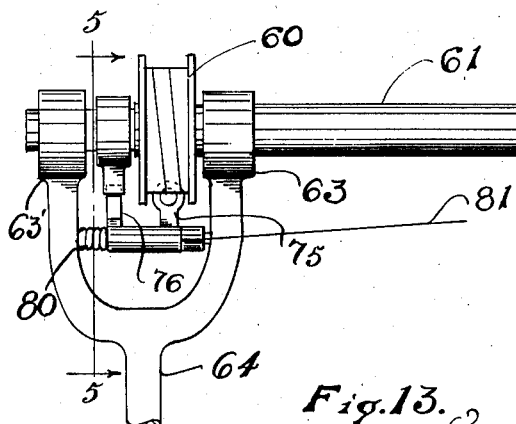
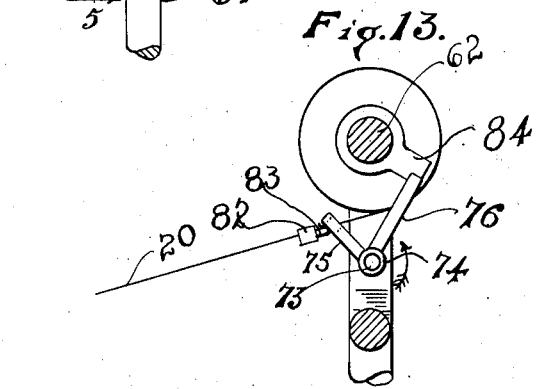
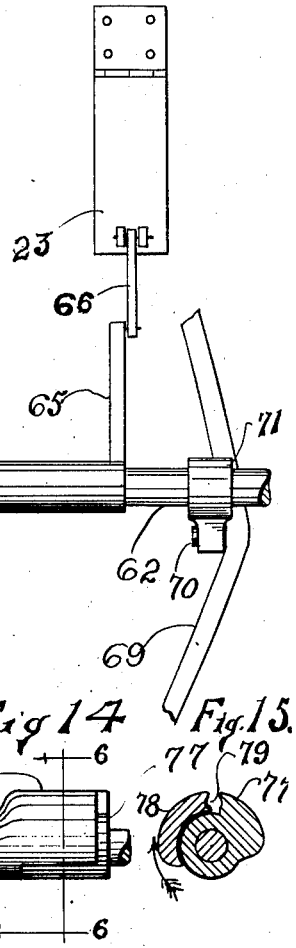

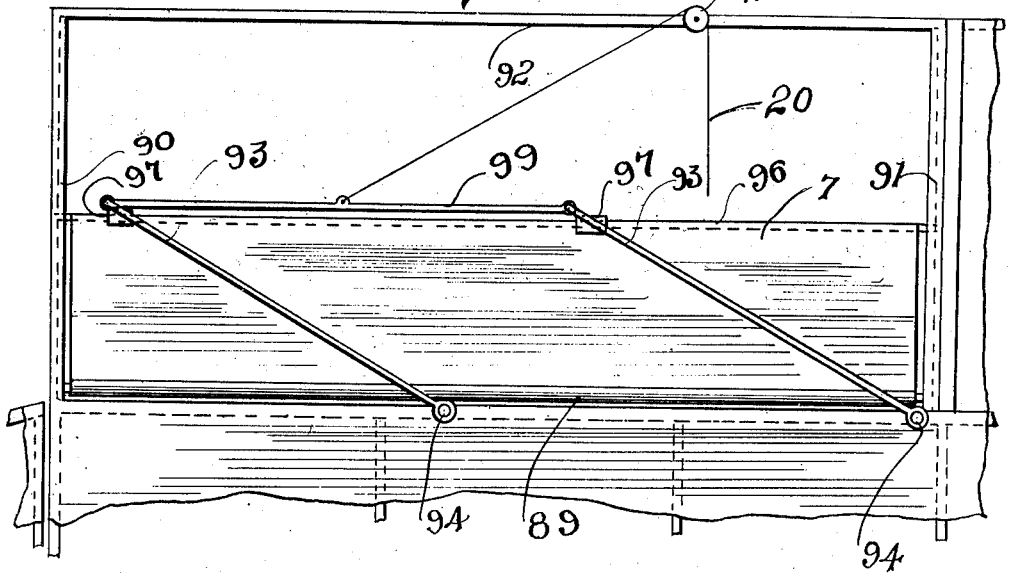
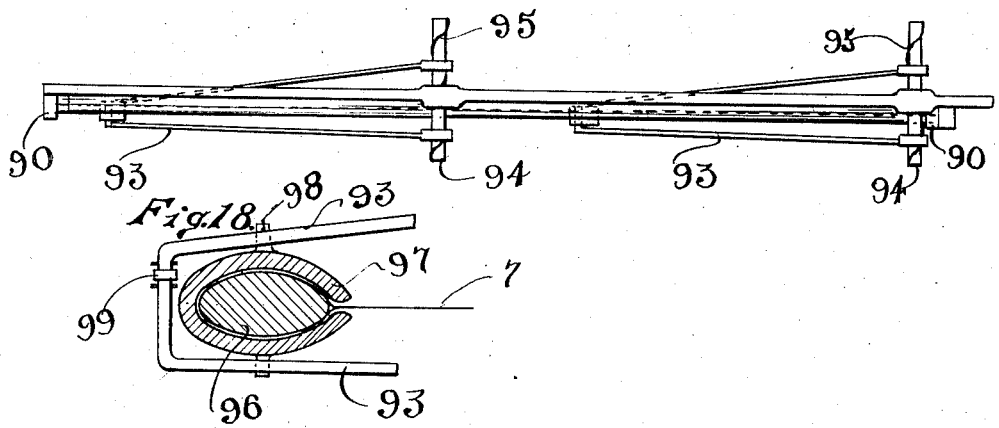

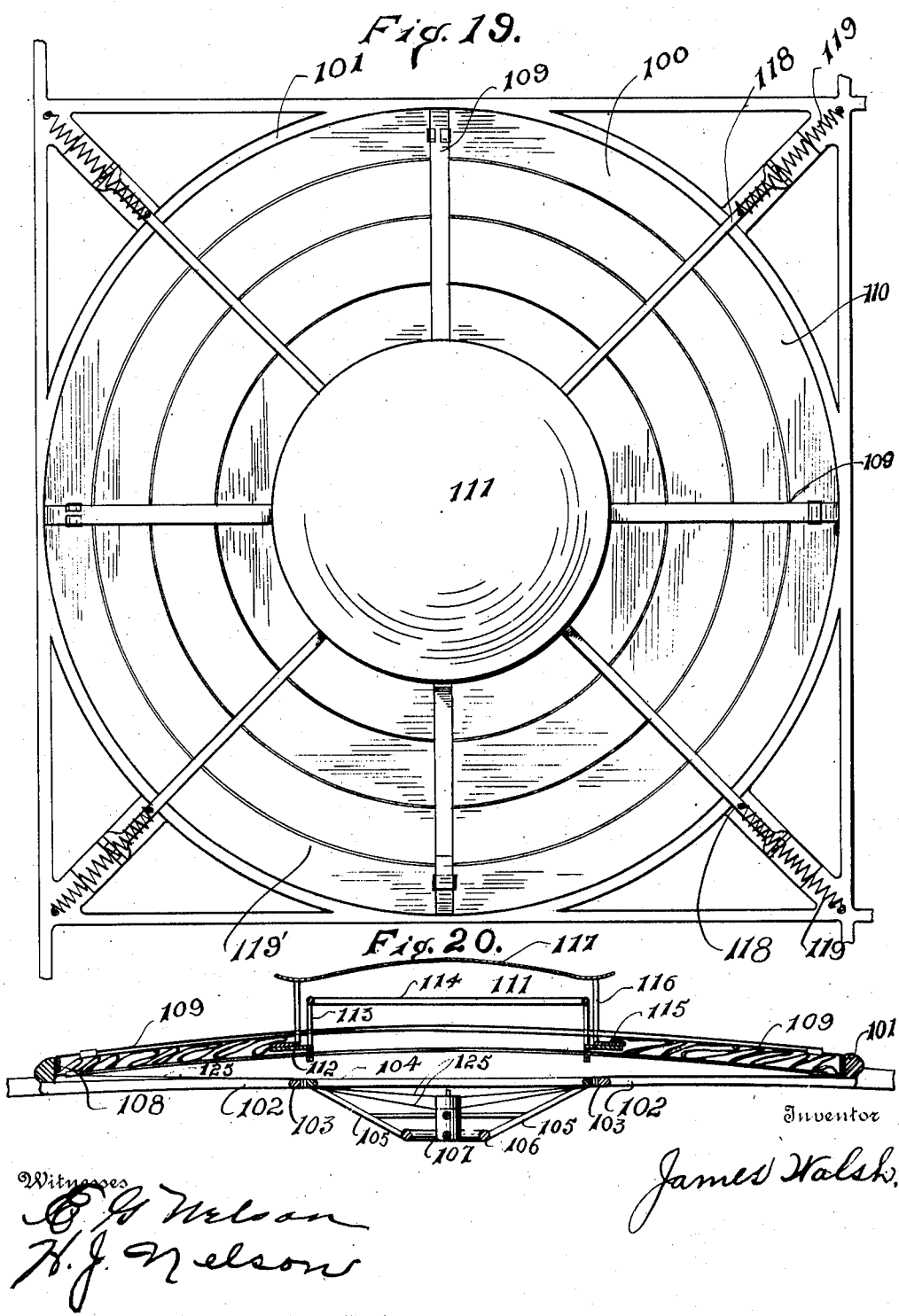

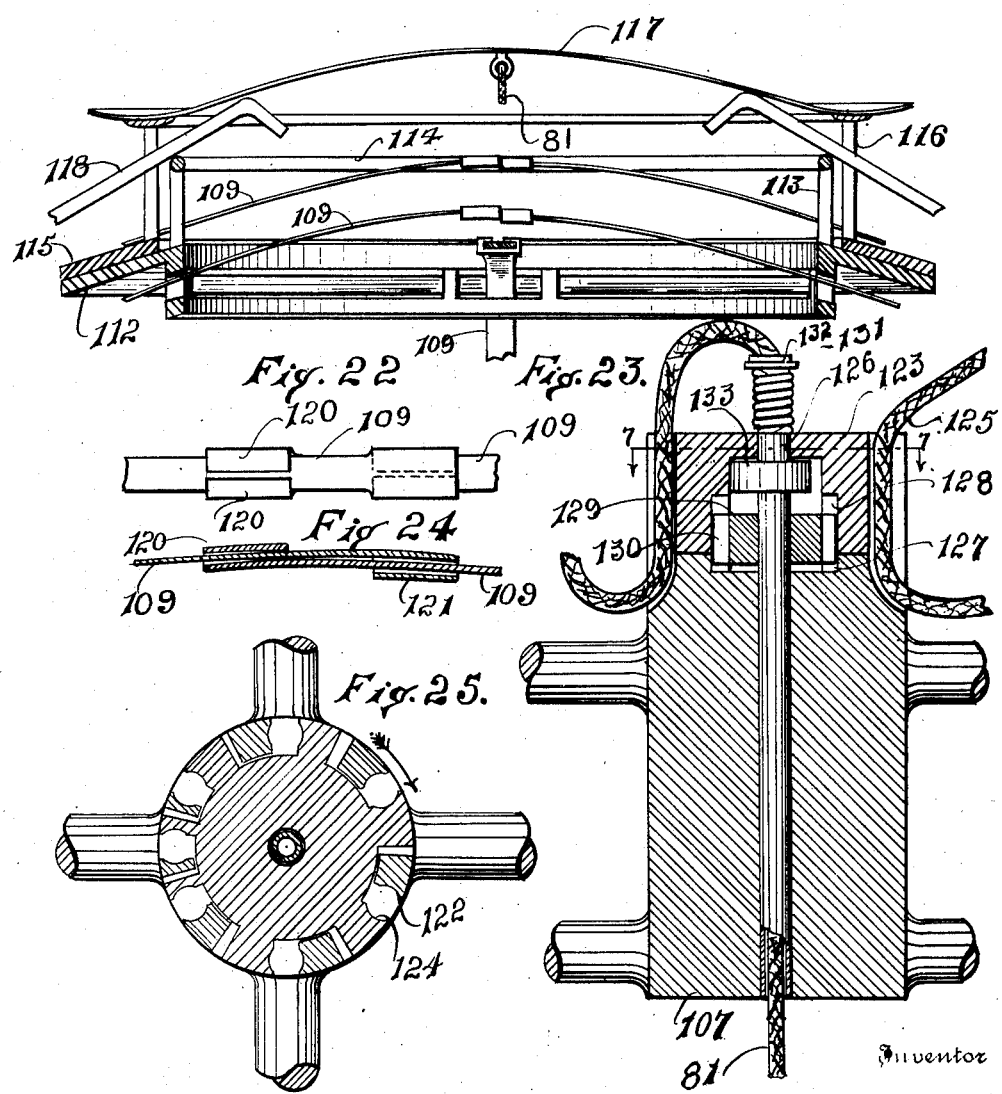

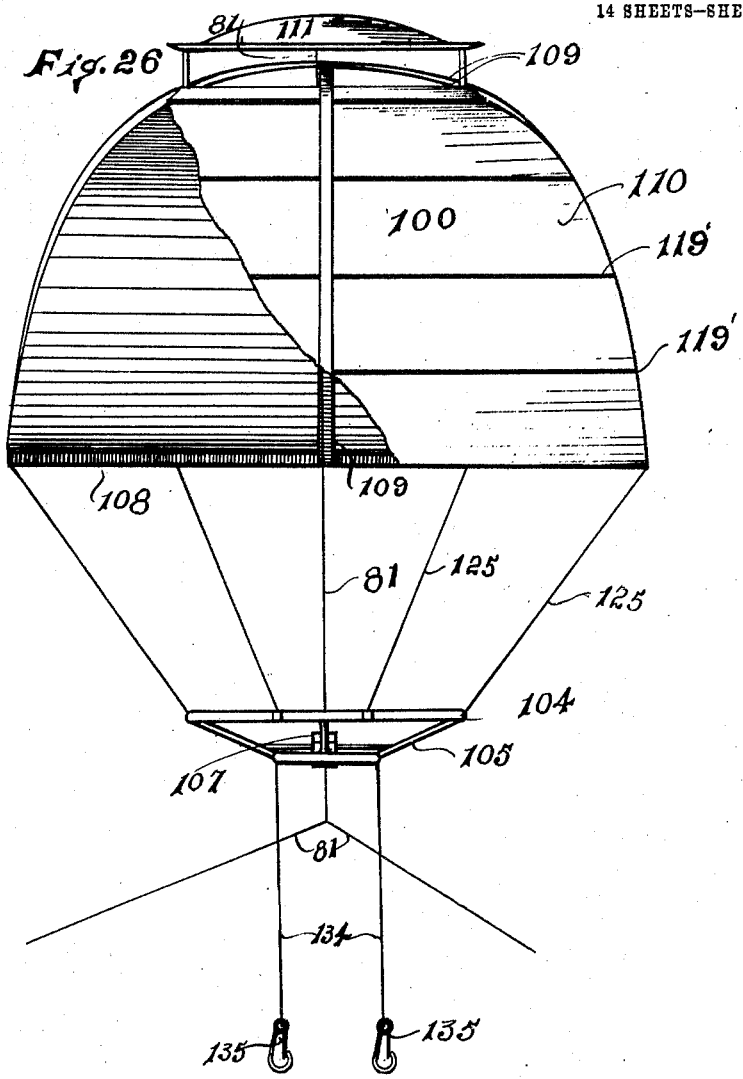

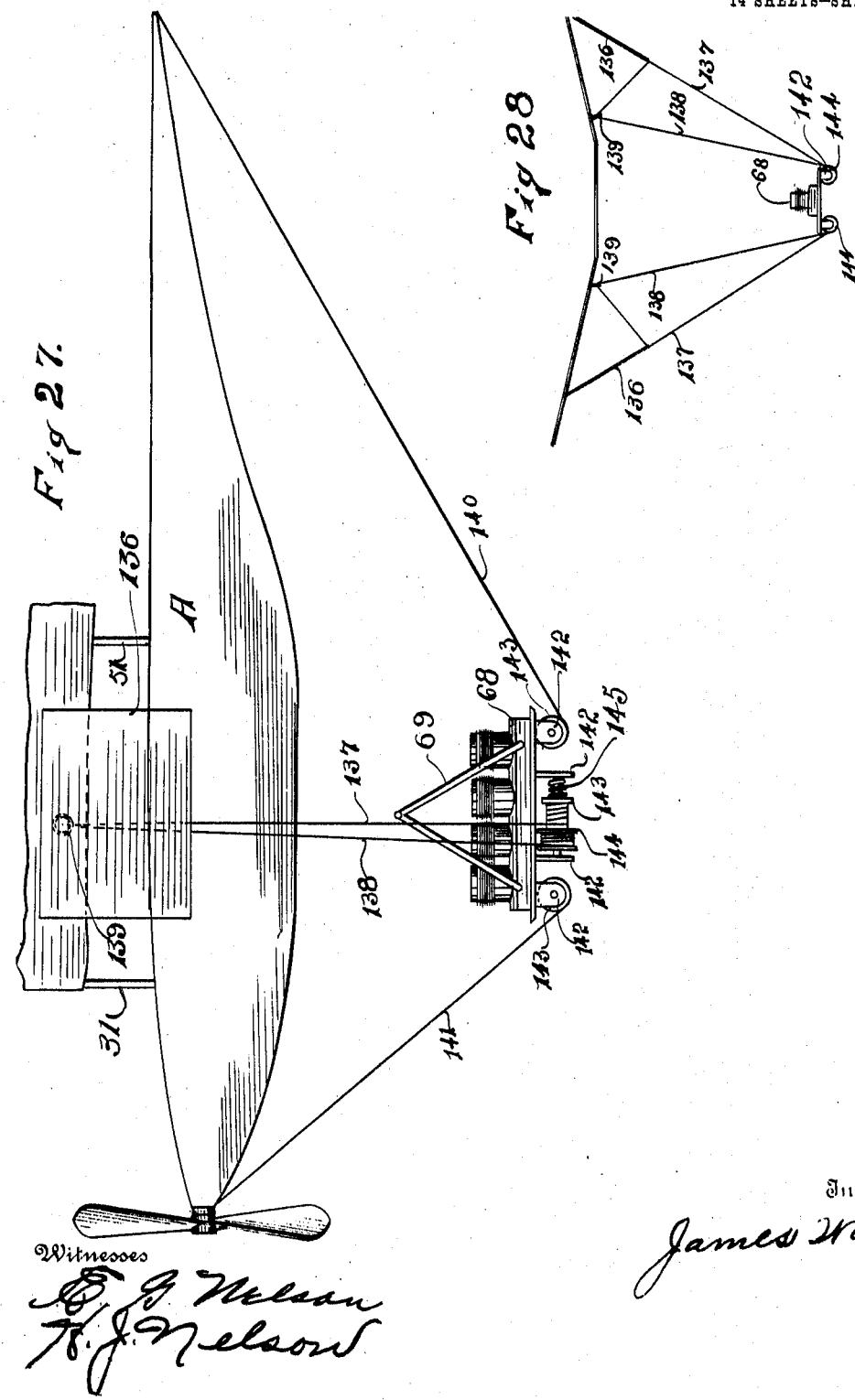

J. WALSH.
FLYING MACHINE.
APPLICATION FILED AUG. 1, 1911.

1,025,891.

Patented May 7, 1912.

Witnesses

Inventor
James Walsh.

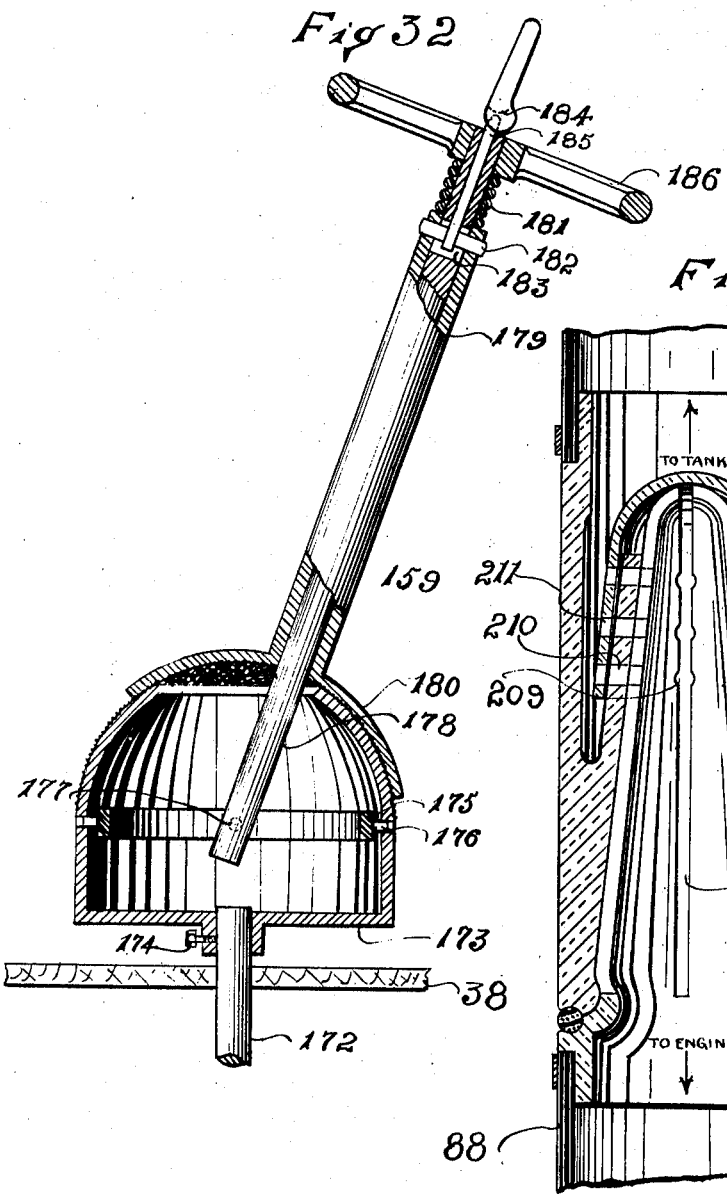

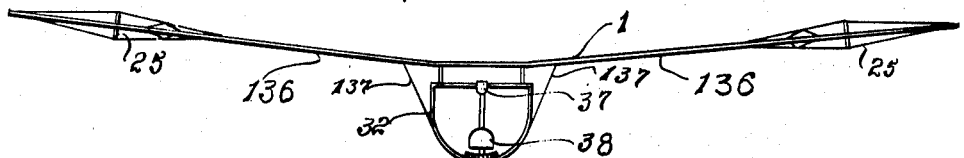
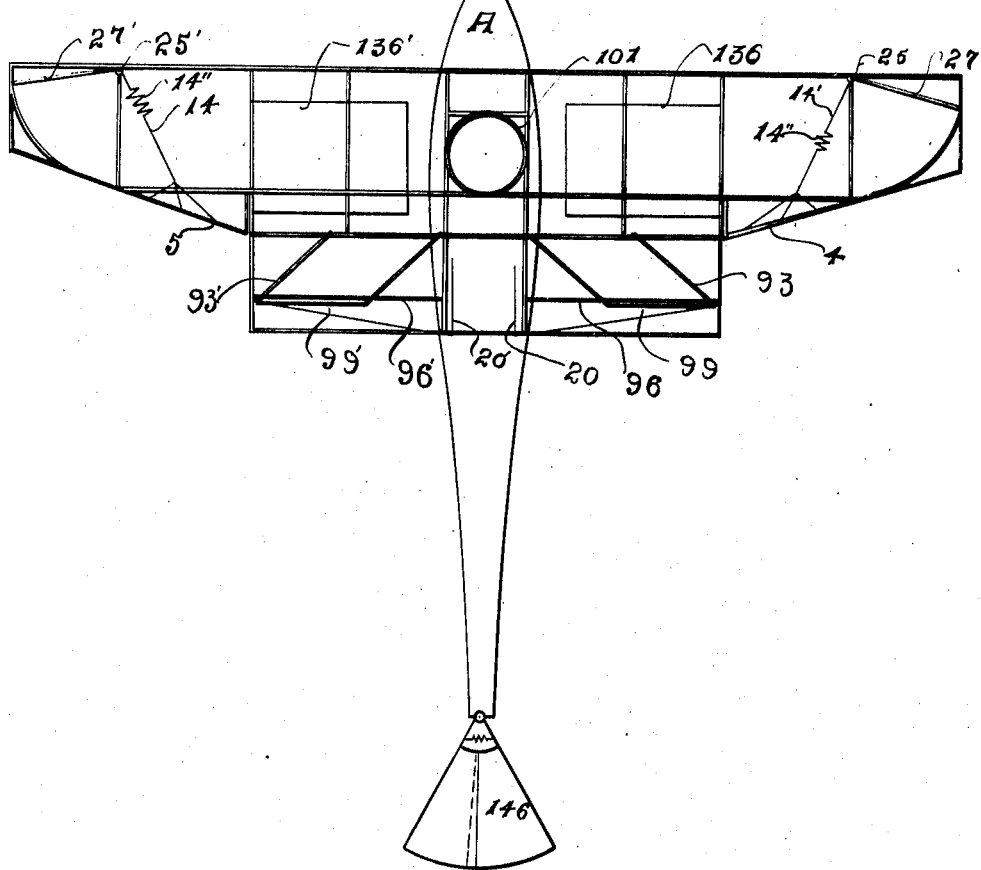

J. WALSH.
FLYING MACHINE.
APPLICATION FILED AUG. 1, 1911.
1,025,891.
Patented May 7, 1912.
14 SHEETS—SHEET 14.
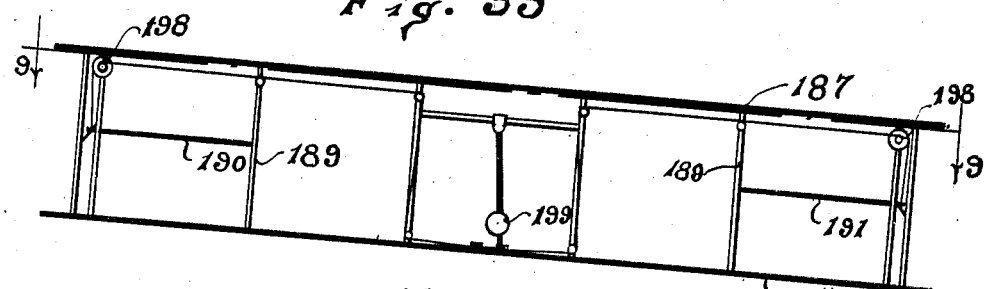
Fig. 35
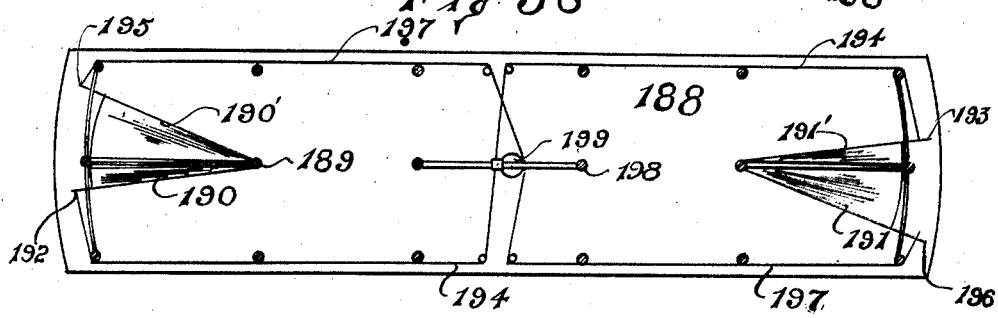
Fig. 36
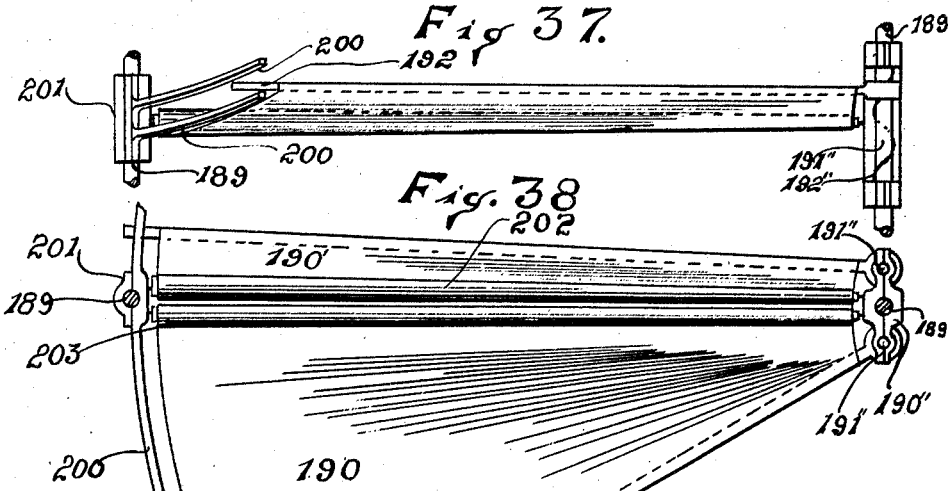
Fig. 37.
Fig. 38
Witnesses
C. J. Nelson
H. Jr. Nelson
Inventor
James Walsh

UNITED STATES PATENT OFFICE.

JAMES WALSH, OF NORTHFIELD, MINNESOTA, ASSIGNOR TO JOSEPH H. DAUNT, OF MINNEAPOLIS, MINNESOTA, AND JOHN A. WALSH, OF NORTHFIELD, MINNESOTA.

FLYING-MACHINE.

1,025,891.  Specification of Letters Patent.  Patented May 7, 1912.

Application filed August 1, 1911.   Serial No. 641,859.

*To all whom it may concern:*

Be it known that I, JAMES WALSH, a citizen of the United States, residing at Northfield, in the county of Rice and State of Minnesota, have invented a new and useful Flying-Machine, of which the following is a specification.

The following is a brief statement of the features which applicant desires to incorporate in the invention of a flying machine: (1) Natural stability. (2) Efficient balancing surfaces. (3) Means to prevent unbalancing due to a change in the velocity of the machine relative to the supporting fluid. (4) A system of ailerons to preclude unbalancing. (5) Simultaneously operable automatic and manual control. (6) Increase of rate of operation of the automatic means for excessive unbalancing. (7) Means to save the life of the aviator and also to save the machine in case of loss of control.

The manner in which the invention is carried out in order to embody the above features, and to attain the main objects sought, which are efficiency in flight and safety, is described in what follows.

Figure 10:
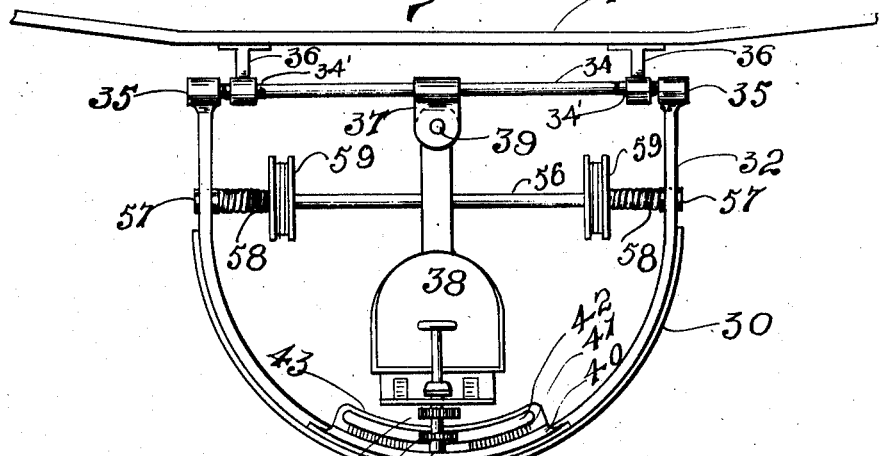
Figure 11:
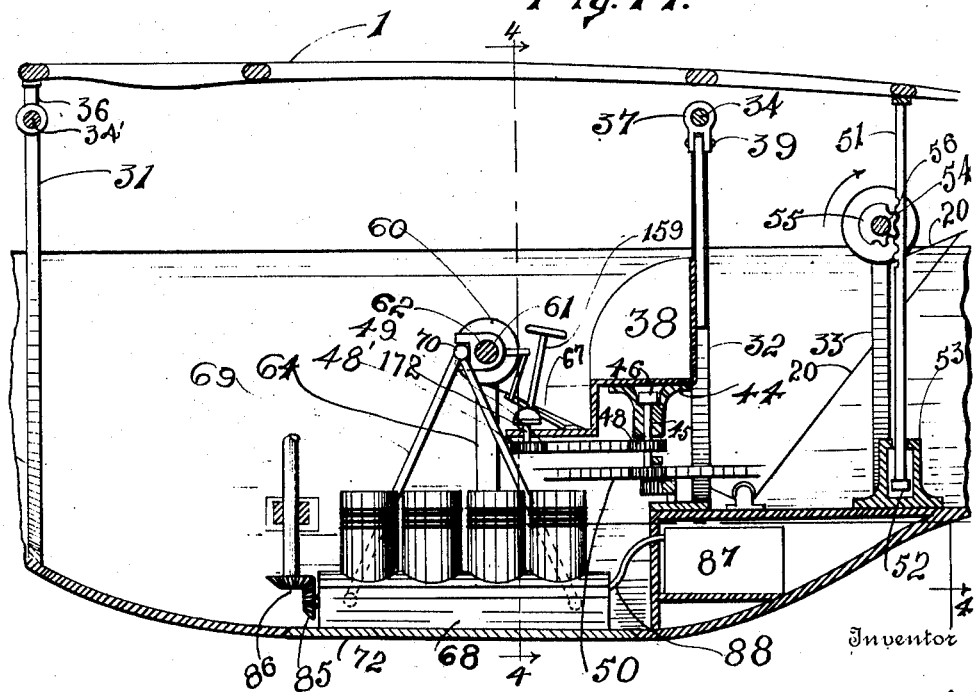

Referring to the drawings: Figure 1 shows a plane in which the center of gravity is located in the plane. Fig. 2 shows a plane in which the center of gravity is located at some distance below the plane. Fig. 3 shows the center of gravity located below the plane and the center of oscillation in the plane. Fig. 4 is a section along the line 1—1 of Fig. 7 to show the curvature of the main plane at the middle. Fig. 5 is a section along the line 2—2 of Fig. 7 to show the curvature of the main plane near its ends. Fig. 6 shows the movable parts of the main plane and connections for operating the same. Fig. 7 shows the stationary or supporting section of the main plane. Fig. 8 is an elevation showing the right hand aileron of Fig. 6, in detail. Fig. 9 is a plan view of the aileron. Fig. 10 is a cross section through the body of the machine on the line 4—4 of Fig. 11. Fig. 11 is a section on the longitudinal center line of the body of the machine. Fig. 12 is a detail view showing one end of the engine supporting shaft, the mechanism which releases the engine supporting means, and the mechanism which is operated manually to increase the area of the plane. Fig. 13 is a section on the line 5—5 of Fig. 12. Fig. 14 shows the releasing dog which releases the parachute cord. Fig. 15 is a section on the line 6—6 of Fig. 14. Fig. 16 is a detail in plan showing the structure for increasing the area of the main plane. Fig. 17 is an elevational view of the structure shown in Fig. 16. Fig. 18 shows the manner of connecting the operating rods to the edge of the extensible part of the plane. Fig. 19 shows a plan view of the parachute folded in inoperative position in the plane. Fig. 20 is a central sectional view of the parachute shown in Fig. 19. Fig. 21 is a sectional view of the parachute cap. Figs. 22 and 24 are details showing the sliding connection of the parachute ribs. Fig. 23 is a vertical section of the device which holds the supporting and releasing cords of the parachute. Fig. 25 is a horizontal section on the line 7—7 of Fig. 23. Fig. 26 is a view showing the parachute open, part of the fabric being removed. Fig. 27 is a view longitudinally of the machine showing the motor in lowered position and the balancing fins drawn down. Fig. 28 is a detail showing further the means for lowering the balancing fins, and is on a smaller scale than Fig. 27 and in a direction at right angles thereto. Fig. 29 is an elevation of the rudder and operating mechanism therefor. Fig. 30 is a plan view of the same. Fig. 31 is a detail on the line 8—8 of Fig. 30. Fig. 32 shows the steering post on a large scale. Figs. 33 and 34 are respectively diagrammatic elevation and plan views of the frame of the machine. Fig. 35 is an elevation showing the application of extensible ailerons to a biplane. Fig. 36 is a section on the line 9—9 of Fig. 35. Figs. 37 and 38 are respectively details in elevation and plan showing the aileron structure. Fig. 39 shows a section through the valve in the gasolene pipe.

When a gust of wind strikes an aeroplane and throws it out of balance the structure as a whole must rotate or oscillate about some point. It is evident that the greater the resistance which the aeroplane offers to rotation about this point the greater the stability of the structure. If we assume that rotation takes place about the center of gravity, it will be clear from an inspection of Figs. 1 and 2 that the greatest resistance to rotation would be offered in the case where the center of gravity lies in the plane, that the resistance to rotation decreases as the center of gravity is lowered, and that for a low center of gravity oscillations of quite appreciable amplitude can take place with slight disturbances since the plane moves at first almost edge on against the air and offers very small resistance. The assumption that the structure rotates about the center of gravity, would be however true only for infinitely large velocity, which would make the inertia of the weight of the machine infinite and hence the center of gravity would be fixed from motion out of the line of flight. In the design of this machine it is assumed that the machine when thrown out of balance under favorable conditions oscillates as a pendulum, that is, it will gyrate about a center of oscillation which is distant from the center of gravity ⅔ of the distance between the center of gravity and the center of pressure on the plane. The machine is arranged so as to bring this center of oscillation in the supporting plane so as to make the machine as stable as possible.

In Fig. 3, G represents the center of gravity, O the center of oscillation and P the center of pressure on each wing of the machine. The distance $X = \frac{1}{3}(X+Y)$ and the distance $Y = \frac{2}{3}(X+Y)$.

Referring to Figs. 4 and 5, it will be noted that the plane has considerably greater curvature and depth at the center of the machine than at the ends. It is given greater depth at the center to keep the center of pressure on each wing of the machine as near the longitudinal center of the machine as possible, and greater curvature is required in order that the supporting force of the central part may be in proportion to the depth. The idea aimed at is to make the supporting force of the part near the longitudinal center line as large as possible in proportion to the total sustaining force, since the unbalancing moment of an unbalanced pressure at either side on the plane is thus decreased, for the nearer the center of pressure on either side of the machine is to the longitudinal center line of the machine the less will be a moment of a disturbing force, and hence the greater the stability. The front part of the plane is wedge shape to conform to the direction given to the air currents after impingement upon the front edge, so as to prevent eddies in the air due to the formation of a vacuum on either surface. The surface of the plane and ailerons is preferably aluminum sheet.

The machine comprises the following parts, the detailed description and mode of operation of which will be fully described hereinafter. The main plane is rotatably mounted to turn about an axis 34' near its front edge, said axis being transverse to the plane. The rear edge of the plane is held down by the action of springs 58 and is adapted to be raised by the action of the wind pressure upon the plane. At the ends the plane is provided with extensible ailerons 2—3, said ailerons being operated by cords which extend to a combined pendulum, and, manually operated device, comprising a seat 38 and steering post 159 carried thereby. Along the rear edge of the plane adjacent to the ailerons 2—3 are flexible ailerons 4—5 said ailerons being interconnected with ailerons 2—3 in such a manner, that extension or contraction of the surfaces 2—3 causes a warping of the surfaces 4—5 either upward or downward. To the rear of the central part of the plane are curtains 6—7 which are operated by the raising or lowering of the rear edge of the plane. All changes in direction of flight are accomplished by a single horizontal rudder, which upon its sidewise movement is canted to the horizontal and thus acts somewhat as a vertical rudder. The engine is mounted so that it may be lowered from the body of the machine, and suspended from points at the front rear and sides of the machine; the release of the engine being accomplished by the operator pressing upon the foot pedals 23—23'. Simultaneously with the lowering of the engine, side fins 136 are drawn down, and a collapsible parachute 100, normally held down upon the plane, is released. At the front of the machine is carried a propeller.

Referring to Fig. 6 there are shown extensible ailerons 2 and 3 one at each end of the plane, flexible ailerons 4 and 5 one at each side of the machine, and to the rear and nearer to the center than the ailerons 4 and 5 and extensible curtains 6 and 7 one on each side of the machine and to the rear and nearer to the center than the ailerons 4 and 5. The specific structure and complete operation of the several parts will be described later but the connections, and relations, and the functions of the arrangement are described in connection with Fig. 6 as follows:—The front movable edge of the aileron 2 is connected to the front or movable edge of aileron 3 by a cord 8 which runs as follows:—Forwardly from the edge of aileron 2 over a pulley 9 on the frame work at the end of the plane thence over a pulley 10 on the pivot of the front edge of aileron 2 thence along the plane to a point near the middle, thence downwardly and over a pulley 11 on the floor of the car thence rearwardly to a pulley 12 on the floor of the car, upwardly and along the plane to a pulley 13 on the rear of the framework at the other end of the plane and forwardly to the movable edge of the aileron 3. A cord 8' runs similarly forwardly from the movable edge of aileron 3 and connects to the movable edge of aileron 2 from the rear. The parts of the connections 8 and 8' which run along the bottom of the car at the middle of the machine, consist of sprocket chains as hereinafter described. The ailerons 2 and 3 have normally a considerable angle of incidence, so that there is a force tending to force the front edges of those ailerons rearwardly. The cords 8 and 8' are free to draw back and forth when the machine is at or near balanced position and thus the effective area of the ailerons is varied to keep the pressure at the two ends of the plane equal. The flexible aileron 4 is connected to the aileron 2 as follows: A cord 14 is connected to several points on the rear edge of aileron 4, runs thence forwardly above the plane and over a pulley 15 on the top of the pivot post for aileron 2 thence outwardly over a pulley 16 on the frame work of the plane and thence rearwardly to the movable edge of aileron 2. A cord 17 is connected likewise to several points on the rear edge of aileron 4, thence forwardly underneath the plane, over a pulley 18 on the lower end of the pivot post of aileron 2, thence rearwardly and over a pulley 19 on the rear of the framework at the end of the plane and forwardly to the movable edge of the aileron 2. The connections of the aileron 5 to aileron 3 is similar. The connections 14 and 17 may have springs inserted therein or the ailerons 4 and 5 may be made sufficiently flexible of themselves. The operation of the ailerons 4 and 5 is as follows. Supposing the movable edge of the aileron 2 to move back about its pivot due to an increase in pressure at that end then the cord 14 of the machine is drawn upon and aileron 4 raised at its rear edge. Simultaneously the front edge of aileron 3 is moved forwardly through the connection 8', which movement draws upon the cord 17' and draws down the aileron 5 at the rear. In like manner a change in pressure upon the ailerons 4 and 5 causes a change in the position of ailerons 2 and 3. Thus it is seen that the functions of the two sets of ailerons are supplementary to each other and that together they form a system which is responsive to changes in pressure in the neighborhood of either end of the plane and thus unbalancing is prevented if the disturbing force be not too violent. The extensible curtains 6 and 7 can be operated either manually or automatically. The manual means only is shown in Fig. 6. Cords 20 and 20' are connected to the rear edge of the curtains, and run rearwardly over pulleys 21, 21' and thence forwardly under pulleys 22, 22' on the floor of the machine and thence over drums 60 (Figs. 11 and 12) which drums are operated by the operator pressing upon foot pedals 23 and 23'. The curtains can be operated independently manually of course and can in this way be used to balance the machine, but their primary purposes are as hereinafter decribed to allow the supporting area of the plane to change with the speed, and to be fully extended and give a parachutic effect in descent.

In Figs. 8 and 9 which show the structure of the ailerons more in detail there is shown the conical spring roller 24, upon which the aileron is rolled, said roller being mounted at its front and rear ends in the front and rear edges of the plane. The front edge of the aileron is mounted to turn upon a post 25 which has an external spiral 26 thereon to engage an internal spiral on the hub 28 of the movable edge 27. Therefore, when the movable edge of the aileron is moved forwardly it will also move upwardly, thus causing to take place simultaneously a change in the area of the aileron and a change in the angle of incidence. The outer end of the edge 27 runs between guides 29. The upper and lower ends of the post 25 carry pulleys as described in connection with Fig. 6.

In Figs. 10 and 11 there is attempted to show the automatic mechanism for working the ailerons and for causing the area of the plane to vary with the speed in this case meaning the velocity of the machine relative to the supporting fluid. Certain of the ribs in the aeroplane body extend vertically above the top of the car and carry bearings at their upper ends, these ribs being shown at 31, 32 and 33 in Fig. 11. The bearings 35 on the extensions of rib 32 carry a shaft 34 rigid therewith, upon which shaft is rigidly mounted a support 37 on which a seat 38 is pivoted at 39. The bottom of the seat carries a bracket 44 which forms a bearing for a shaft 45 having a head 46. The shaft 45 carries sprocket wheels 47 and 48 and a pinion 47'. The pinion 47' meshes with the teeth of an arcuate rack, which is part of a rack and guide arrangement 40 carried by rib 32 at the bottom of the car. The rack bar is devoid of teeth for a short distance on each side of its middle. The guide 43 is to guide the sprocket chains 50 which form the fore and aft portions of the aileron connections 8 and 8', and which run one on each side of, and both normally in engagement with the sprocket 47. During the swinging of the seat to either side only one chain 50 is in engagement with the sprocket 47 and that one is free to draw fore and aft, until the machine reaches such a state of unbalance as to bring the pinion in contact with the teeth of the rack. Up to this point the operation of the ailerons is comparatively slow and is due to the kinking of the fore and aft extending connection, but when the pinion comes into engagement with the rack the rate of operation is greatly increased, since the pinion 47' is small in comparison to the sprocket wheel 47', which gives a rapid rate of operation. The rate of operation of the automatic means can be modified manually to suit the aviator by turning the steering post 159 which is mounted in the foot platform of the seat 38 and has a sprocket gear 48' on its lower end which is connected by a sprocket chain 49 to a sprocket wheel 48 rigid with the shaft 45. The aviator can by this means increase or decrease the rate of the automatic operation or reverse the direction of operation if desired. The front edge of the plane is carried by brackets 36 which have bearings loosely mounted upon a shaft 34' rigidly carried in bearings in the extensions of rib 31. The rear of the plane is supported at its middle by a rod 51 which has a head 52 on its lower end, said head being free to slide up and down in a slot in a bracket 53 carried by the rib 33 in the bottom of the car. Said rib 33 has bearings 57 at its upper ends in which is rotatably mounted a shaft 56, which carries a pinion meshing with a rack 54 on supporting rod 51. Near each end the shaft 56 carries rigidly with it drums 59 and upon the shaft and connected at one end to the bearings 57 and at the other end to the drums 59 are springs 58 which tend to rotate the drums 59 in the direction of the arrow in Fig. 11 and thus maintain the rear of the plane in lowest position and wind the cord 20 upon the drums 59 and thus draw out the extensions 6 and 7 as hereinafter set forth more in detail. It is therefore clear that should the machine strike a point in its course where the air pressure upon the plane suddenly decreases due to cross or counter currents and which constitutes a change in the speed of the machine relative to the supporting fluid, that immediately the rear of the plane will be lowered to increase the angle of incidence and the area of the plane will be simultaneously increased which operations counteract the danger of sudden drops and consequent unbalancing due thereto. Figs. 11 and 12 also show means whereby the engine is released from the body of the machine and becomes suspended from four points on the machine as shown in Figs. 27 and 28. Referring to Fig. 11 it will be noted that the part of the car bottom to which the engine is attached, is separate from the remainder of the bottom and forms a sort of a door in the bottom of the car. The engine 68 is supported from a shaft 62 which is mounted to turn in bearings 63, at each side of the machine, said bearings being carried at the upper ends of vertical supports 64, which are mounted to the car bottom.
Only one-half of the shaft 62 is shown in Fig. 12 but the other part, and the associated mechanism, is exactly the same. Said shaft 62 carries slotted brackets 71 rigid therewith. The engine has supporting brackets 69 at each side and the brackets 69 have pins 70 at their upper ends which project through the slots in the brackets 71. Mounted near each end of the shaft 62 are dogs 74 which have projections 76 which normally engage brackets 84 as shown in detail in Fig. 13. The brackets 84 are rigid with shaft 62 which is thus held in position so as to support the engine. The supports 64 have bearings 63 in which rotate sleeves 61 mounted upon shaft 62 and which sleeves are connected to the foot pedals 23 and 23' by links 66. The sleeves 61 carry drums 60 rigid therewith upon which run branches of the cords 20 and 20', those branches also being numbered 20 and 20'. It will be noted that pressure upon the foot pedals 23 or 23' winds the cords 20 or 20' upon the drums 60, and thus draws out the extensible curtains. In this connection the dog 74 requires further description. In Fig. 12 there is shown a spring 80 which normally keeps the projection 76 in contact with the bracket 84. This spring has also the function of holding one end of the parachute rope 81 which rope extends transversely across the machine an end being held in a recess 79 at each side as here described. The rigid shaft 73 upon which the dog 74 is mounted to turn carries a rigid sleeve which has a projection having a recessed face. Part of the dog extends over this sleeve and the edge of this part is recessed and since the spring 80 tends to rotate the dog 74 in the direction of the arrow it is seen that the rope 81 will be firmly held in the recess 79 formed between the adjacent recessed faces. The dog 74 also has a projection 75 through which the cord 20 runs. The cord 20 has a stop 82 thereon, said stop having a hook 83 thereon. The stop is arranged to come in contact with the projection 75 when the curtains are extended to almost their full extent. When the aviator wishes to abandon the machine he presses the foot pedals down as far as they will go. This action draws the stop 82 against the projection 75 which rotates the dog 73 to lower the engine, and, release the parachute as more fully described hereinafter. The extensible curtains are maintained in extended position by the hook 83 on stop 82 which engages the projection 75 when the stop 82 is brought in contact therewith. The extensible curtains as shown in Figs. 16 and 17 are carried on spring rollers 89 which are mounted adjacent the rear edge of the plane. The ends of movable edge 96 run in downward curved guides, 90, 91, which project rearwardly and together with a transverse member 91 form a framework for the extensible parts. The operating rods 93 for the curtains are mounted at their inner ends to rotate upon posts 94 fixedly mounted on the rear edge of the plane and having external spirals 95 which engage internal spirals on the hubs of the operating rods. It is therefore seen that when the operating rods are rotated to extend the curtains that they are simultaneously lowered due to the spiral mounting and therefore the angle of incidence of the curtain increases with the area. The operating rods are connected at their rear ends by a connecting rod 99 to which the cord 20 is connected, said cord extending over a pulley 21 on the member 92 and thence forwardly to the operating means as already described. The operating rods 93 have pivoted in their ends at 98 open sleeves 97 which slide on the movable edge 96 of the extensible curtain.

The parachute 100 when in inoperative position fits down inside a confining rim 101 in the supporting plane and its upper surface forms the upper surface of the plane within the space which it occupies. The under surface of that part of the plane is formed by a framework consisting of a rim 103 and supporting rods 102, which framework is covered with the same material as the rest of the plane. The diameter of the rim 103 is somewhat greater than the longest diameter of the aviator so that the aviator may make his egress therethrough. The space inside the rim 103 is not covered with fabric, but the parachute-cord retaining device which has a rim 104 fits loosely inside the rim 103. The parachute is constructed of fabric 110, rim 108 and ribs 109 inside and outside of the fabric, both ribs and rim being collapsible as here explained. Referring to Figs. 22 and 24 it will be seen that the connection is formed by a widening of the ends of the ribs where the connection is to be made, the widened end then being bent around the body of the other part of the rib as shown at 120 and 121. The length of the ribs is about twice the diameter of the parachute and when collapsed upon themselves one-half of the rib slides along the other half. The central part of the parachute is surmounted by a cap 117, between the flanges 112, 115 of which, the inner edge of the fabric 110 of the parachute is held. The lower flange 112 has a downwardly extending projection through the openings of which the inner ribs 109 are guided, and upwardly extending projection 113 which supports a rim 114. The upper flange has upwardly extending projections 116 which carry a rim to which the retarder surface 117 is attached. The cord 81 is connected to the retarder 117, and normally holds the parachute collapsed against the action of the rods 118 which are hingedly mounted upon the frame of the plane and have helical springs 119 connected thereto, said springs tending to raise the rods 118 and thus erect the parachute. It will be noted by reference to Fig. 21 that the rods 118 have bent ends and as they raise the parachute when it is released they will also maintain it directly over the opening in the plane until it is fully open and the aviator is ready to ascend, the rods are then at such an angle as to allow their disengagement from the cap 111, and they are then drawn back out of the path of the ascending parachute by the springs 119. Wires 119' are connected to the fabric of the parachute so as to retain it as a smooth surface when in folded condition.

The supporting cords 125 for the parachute are connected to the rim of the parachute at one end and to the rim 104 at the other. When the parachute is folded the supporting cords 125 are held taut extending from the rim 108 through openings between rims 103 and 104, thence through a retaining device 107 and back to the rim 104. The manner of operation of the retaining device is as follows:—The lower part 107 has a hollow, slidable but non-rotatable shaft 126 extending therethrough and has at its upper end a cap 123 which is free to rotate upon the shaft 126. Projections 122 on the part 107 having recessed faces extending upward adjacent to and between projections 124 having recessed faces carried by the cap. The upper part of 107 is recessed and the circumference of the recess has teeth 127. The lower part of part of the cap 123 is also recessed and the circumference of the recess has teeth 128. Rotatably but non-slidably mounted upon shaft 126 is a member 129 having teeth 130. When the teeth of the member 129 are in engagement with the teeth of both 107 and 123 it is in holding position and the ropes 125 and 81 are all held securely in between the faces 122, 124. On the top of the cap 123 is a helical spring 131 which engages a cap on the top of the shaft 126 and tends to force the shaft 126 upwardly, the shaft being held down by the stop 132 on the cord 81. When cord 81 is released by the dogs 74 the spring 131 forces the shaft 126 upwardly which brings the teeth of members 129 out of engagement with the teeth on member 107, and the spiral spring 133 which is connected to the wall of the recess in cap 123 at one end and to the non-rotatable shaft 126 at the other, causes the cap to rotate in direction of the arrow in Fig. 25 and thus frees the cords which then allows the parachute to rise. If the spiral spring 133 should fail to work the cord 81 in being drawn out of its retaining recess would turn the cap 123 and thus free the other cords 125. The aviator's harness may be connected to the cords 134 by connectors 135.

In Figs. 27 and 28 where the motor is shown in lowered position, it will be noted that the points of support for the motor in this position are at the front and rear ends of the machine and at points about one halfway out upon the wings of the plane. The drums upon which the supporting cords are wound have springs 145 which are fastened at one end to the mounting 142 of the drum shaft and at the other end to the drum itself, said springs acting against the tension of the cords and lowering the motor without shock and resiliently supporting it in lowered position. The drums connected to the lateral supporting cords 137, 138 consist of a drum 143 the same size as the other drums 143 and connected thereto is another drum 144 which is about twice the circumference of drum 143. When the motor is in its normal position in the machine it will be noted in Fig. 33 that the side fins 136 are in position against the lower surface of the plane. These fins are so held by the cords 138 which are attached to the inner ends of the fins, are roven through rings 139 on the plane a short distance from the inner ends of the fins and extend downwardly to the drums 144. Now when the motor begins to lower upon release the cord 138 is paid off of the drum 144 at about twice the rate at which the cord 137 is paid off of the drum 143 thus allowing the fins 136 to come into lowered position as the motor is lowered. The object of lowering the motor is to bring the machine back to righted position, since the motor will be supported almost entirely by the part of the machine which is above the level. The fins prevent side skidding and together with the extensible curtains give the plane a parachutic effect. The opening in the bottom of the car due to the dropping of the motor and the opening in the plane just above, form a sort of funnel between the fins for the escape of air upward.

The rudder 146 consists of two parts 147 and 148. The inner ends of both parts are mounted upon a rudder post 153 which has external spirals 156, 157 of opposite pitch thereon to engage corresponding internal spirals on the hubs of the supporting edges. The two parts 146 and 147, slide upon each other to collapse, their rear edges being slidably connected as shown in Fig. 31. A spring 158 holds the rudder normally in a partially collapsed position. The rudder post 153 is fixed in a shaft 154 which is rotatably mounted in bearings 155 in the rear end of the body frame work. The rudder is operated vertically by cords 161 which run from the top and bottom of the rudder post to a collar 160 on the steering post 159. The rudder is operated laterally by cords 164, which extend laterally from a collar 163 on steering post 159, are trained over pulleys 165 on the frame of the machine run rearwardly over pulleys 166 on the shaft 154, and branch off at 167, one branch running directly to the near edge of the rudder 168 and the other normally slack branch running under a pulley 171 on a frame 170 which projects downwardly from the near edge and thence said second branch extends across underneath the surface of the rudder and is connected to the far edge at 169. Pushing the steering post fore and aft raises or lowers the rudder. When the steering post is moved sidewise it draws first upon the branch of the cord which is connected at 168, until the rudder is expanded, when the loose branch of the cord is drawn taut, and the two parts of the rudder move together about the post 153. The spirals 156 and 157 being of opposite pitch will result in opposite vertical movements being imparted to the edges 151 and 152 when rotated about the post so that the rudder will be warped and thus be effective in steering the machine in a vertical plane when it is moved laterally. The spirals are of such pitch that the advancing edge of the rudder will be raised while the trailing edge will be lowered upon rotation in either direction.

The steering post 159, which is also rotated to manually operate the ailerons is universally mounted upon the shaft 172. Clamped to the top of shaft 172 is a hollow casing 173, dome shaped and open at the top. Near the bottom of this casing a ring 175 is mounted to turn in trunnions 176 and the shaft 178 of the steering post is mounted on trunnions 177 which have their bearings in ring 175 at right angles to the trunnions 176. The top surface of the casing 175 is knurled or has projections raised thereon as is likewise the bottom surface of a coacting member which forms the expanded lower end of a sleeve 179 which slides on the shaft 178. The sleeve is normally pressed down by a spring 181 and the surface 180 is held in engagement with the surface of the casing 173, in which position the steering post is rigidly held from motion in any direction except about its axis. To raise the sleeve and unlock the joint there is provided a dog 184 at the top of the steering wheel to which is pivotally connected a rod 185 which extends downward through a hollow in the top part of the shaft 178. A pin 182 extends through the top of the sleeve 179 and also through a slot 183 in shaft 178, the slot 183 being of width to allow the pin to move up and down therein. The lower end of rod 185 connects with pin 182, so that in pulling the tail of the dog 184 down the sleeve is drawn up through the connecting members and the surface of 180 is raised out of contact with the surface of 173 and the post 159 is then free to be moved in any direction to work the rudder as desired.

In the application of the invention to a bi-plane the principal difference would be in the mounting of the ailerons, which would be mounted upon transverse axes between the planes. There is shown in Figs. 35 to 38 the construction desired, which consists of two ailerons at each end of the plane, the front one at one end being connected with the rear one at the other end. The cord 194 is connected to the movable edge 192 of the left hand aileron 190 extends upwardly and forwardly over a pulley on the upper plane thence toward the center of the machine, when it extends downwardly and over a pulley on the floor of the car rearwardly and thence upwardly and over a pulley on the upper plane, thence outwardly along the plane is trained over a pulley and connected thence to the movable edge 193 of the rear right hand aileron 191'. The connections of the other pair of ailerons is the same. Multipliers may be inserted in the connections at 198 to increase the motion of the ailerons in proportion to the swing of the movable weight 199, which works the ailerons in the same manner as does the seat 38 in the monoplane. The construction of the ailerons is similar in every respect to the structure in the monoplane. The movable edges are mounted upon spiral posts so that when the front aileron is drawn forward the movable edge is raised and so its lower surface is presented at an angle of incidence, and when the movable edge of the rear aileron is drawn rearwardly it is also raised and so the upper surface of the rear aileron is presented at an angle of incidence so that the front and rear ailerons at the same end of the plane have opposite effects in balancing. As shown in Fig. 36 only one of the ailerons at each end is in operation at one time and when the machine is in balance both sets are practically furled up.

When the engine is lowered it is necessary to provide some means to detach the tube 88 leading to the engine from the gasolene tank 87, and also to close the tube to prevent the running of the gasolene from the tank. Such a device is shown in Fig. 39 and is to be inserted in the tube 88 at a point near the engine. The valve consist of three parts, the casing 204, the clack 205 and the plunger 206. The casing and plunger are connected to the pipe 88 by clamps 213 which clamp the pipe securely onto the ends thereof. The clack is normally held up off its seat in the casing by the nose of the plunger 206, which keeps the openings 209, 210, 211 in the plunger, seat, and clack respectively, all in position where they register and the gasolene is allowed to flow through and to the engine. The plunger is slotted as shown at 208 and is held in the casing by the shoulders 207 on the casing which engage a hollow of like conformation in the neck of the plunger, a gasket 212 being placed between the abutting parts of the plunger and casing to prevent leakage of gasolene. When the engine drops the plunger is drawn out of the casing and the clack 205 is allowed to seat and thus brings the openings 210 and 211 out of registration and so prevents the gasolene from escaping.

Various changes may be made in the structure in its practical application without departing from the spirit of the invention.

Having now described my invention what I desire to claim is:

In an aeroplane a horizontal rudder mounted to swing vertically and horizontally, said rudder being extensible in area and, so mounted that upon lateral swinging its leading edge is raised and following edge lowered to warp and cant its surface.

JAMES WALSH.

Witnesses:
E. G. NELSON,
H. J. NELSON.